(12) United States Patent
Wooley

(10) Patent No.: US 9,733,493 B2
(45) Date of Patent: Aug. 15, 2017

(54) LENS SYSTEM FOR PRESBYOPES WITH INTER-EYE VISION DISPARITY LIMITS

(71) Applicant: Johnson & Johnson Vision Care, Inc., Jacksonville, FL (US)

(72) Inventor: C. Benjamin Wooley, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 239 days.

(21) Appl. No.: 14/472,940

(22) Filed: Aug. 29, 2014

(65) Prior Publication Data

US 2016/0062140 A1     Mar. 3, 2016

(51) Int. Cl.
*G02C 7/02*     (2006.01)
*G02C 7/04*     (2006.01)

(52) U.S. Cl.
CPC .............. *G02C 7/04* (2013.01); *G02C 7/024* (2013.01); *G02C 7/041* (2013.01); *G02C 7/042* (2013.01); *G02C 7/044* (2013.01); *G02C 7/047* (2013.01); *G02C 2202/20* (2013.01)

(58) Field of Classification Search
CPC ............ G02C 7/02; G02C 7/061; G02C 7/06; G02C 2202/22; G02C 7/04; G02C 7/024; G02C 7/047; G02C 7/042; G02C 7/044; G02C 2202/20; G02B 1/041
USPC ..................................................... 351/159.01
See application file for complete search history.

(56) References Cited

U.S. PATENT DOCUMENTS

| 5,793,465 | A | * | 8/1998 | Gupta | ...................... G02C 7/06 351/159.21 |
| 8,393,733 | B2 | | 3/2013 | Wooley et al. | |
| 2007/0091260 | A1 | * | 4/2007 | Guillon | ................... G02B 3/10 351/159.05 |
| 2009/0244478 | A1 | * | 10/2009 | Wooley | ..................... G02C 7/04 351/159.08 |
| 2010/0026958 | A1 | | 2/2010 | Wooley | |
| 2010/0134754 | A1 | | 6/2010 | Hong | |
| 2011/0084834 | A1 | * | 4/2011 | Sabeta | .............. G06K 19/07758 340/540 |
| 2012/0123534 | A1 | | 5/2012 | Yoon | |

(Continued)

FOREIGN PATENT DOCUMENTS

EP            780718 A1     6/1997
WO     WO2014128034 A1     8/2014

OTHER PUBLICATIONS

Colins, M., et al., "Distance Visual Acuity and Monovision", Optometry and Vision Science, vol. 70, No. 9, pp. 723-728 (1993).

(Continued)

*Primary Examiner* — Bumsuk Won
*Assistant Examiner* — Henry Duong
(74) *Attorney, Agent, or Firm* — Carl J. Evens

(57) ABSTRACT

A lens system for presbyopes utilizes inter-eye disparity limits to improve vision. The system of lens may be utilized to improve binocular vision when viewing distant, intermediate and near objects by requiring a minimal level of disparity in vision between the eyes wherein the level is not objectionable to the patient. This disparity in vision depends on the lens design for each eye and upon how the lenses are fit in each eye relative to the distance refraction of the patient.

12 Claims, 16 Drawing Sheets

(56) References Cited

U.S. PATENT DOCUMENTS

| | | | | |
|---|---|---|---|---|
| 2012/0327363 | A1* | 12/2012 | Wooley | G02C 7/044 351/159.47 |
| 2014/0043588 | A1* | 2/2014 | Grant | G02C 7/047 351/247 |
| 2014/0155999 | A1 | 6/2014 | Vidal Canovas | |
| 2016/0062145 | A1* | 3/2016 | Brennan | A61F 2/145 623/5.11 |

OTHER PUBLICATIONS

European Search Report for corresponding EP Appln No. 15183028.8 dated Dec. 11, 2015.

* cited by examiner

LENS SYSTEM FOR PRESBYOPES WITH INTER-EYE VISION DISPARITY LIMITS

BACKGROUND OF THE INVENTION

1. Field of the Invention

The present invention relates to contact lenses for correcting presbyopia, and more particularly a system of lenses wherein for every add need, a disparate pair is provided resulting in improved visual performance. More specifically, the contact lens pair will have a level of disparity between the two eyes that is controlled to achieve better visual performance and that is not objectionable to the wearer.

2. Discussion of the Related Art

As individuals age, their eyes are less able to accommodate, or bend their natural or crystalline lens, to focus on objects that are relatively near to the observer. This condition is known as presbyopia. More specifically, when an individual is born, the crystalline lens is pliable which makes it capable of a high degree of accommodation. As the individual ages, the crystalline lens gradually becomes more rigid and thus less able to accommodate. Similarly, for persons who have had their natural or crystalline lens removed and an intraocular lens or IOL inserted as a replacement, the ability to accommodate is absent. Although the intent of an accommodating IOL is to address this potential shortcoming, current accommodating IOL designs and concepts are relatively new and continue to evolve.

Among the methods used to correct for the eye's failure to accommodate is a method known as mono-vision in which, in most cases, a contact lens for correction of distance vision is utilized in the lens wearer's dominant eye, which is known to predominate for distance vision, coupled with a second contact lens for correction of near vision being utilized in the non-dominant eye. Mono-vision provides for both near and distance vision while allowing the brain to compensate as how the images should be construed. Another known method for correction of presbyopia is to use bifocal or multifocal contact lenses in both of the individual's eyes. There are many forms of bi-focal or multi-focal contact lenses for the correction of presbyopia. These design forms include concentric rings and aspheric designs, both of which may be designed for center distance or center near. All of these designs function by providing a range of powers within the pupil of the eye. For example, a concentric ring design may have a central ring that provides powers that are nominally equal to the power required to correct the distance vision of the subject, an adjacent ring that provides near powers, and an outer ring that also provides distance powers. There may also be fitting strategies to address intermediate vision demands between near and far distances, for example, computer screen viewing. Use of bifocal or multifocal lenses in both eyes results in a reduction of image contrast and resolution compared to mono-vision but usually maintains binocularity. Yet another method of treating presbyopia is to place a bifocal or multifocal lens in one eye and a single vision lens in the other eye. The disadvantage in using this method is in the large number of lenses that must be considered in order to provide the individual with satisfactory lens performance and the limitation of binocularity at near distance.

Various classes of contact lens and intra-ocular lens designs are available for the treatment of presbyopia. One solution for presbyopic patients, as briefly set forth above, is to provide them with what is commonly referred to as monovision. With monovision, a single vision lens corrected for best distance vision is placed in the dominant eye. In the non-dominant eye, the single vision lens is fit with power that is plus in power relative to the refraction that gives the best distance vision by an amount equal to the add need of the patient. For example, for a patient that has a distance refraction of −3.0 D in both eyes and a +2.0 D add need, the dominant eye is fit with a −3.0 D spherical lens and the non-dominant eye is fit with a −1.0 D spherical lens. The term "add need" set forth above refers to the increase in power relative to the best distance correction power required to provide the presbyopic patent with near vision at a working distance of 40 cm.

A problem associated with monovision is that once the add need is greater than +1.75 D, many patients cannot tolerate the visual disparity between the two eyes and a decrease in binocularity. Eye care professionals typically define disparity simply as the difference in power relative to distance refraction between the two eyes; accordingly, in the above example, the disparity in power is 2.0 D. Binocularity is defined as the ability to focus on an object with both eyes and create a single stereoscopic image.

For patients with astigmatism, the vision compromise is generally even greater. Also, manufactures are less likely to even provide design for astigmatic presbyopia because of the large number of SKUS required and the problems associated therewith.

Accordingly, it may be readily seen that current lens systems for presbyopic patients inadequately meet or address the patient's needs.

As used herein, a lens system refers to a system of lenses, normally two or three unique designs that are required to meet the add needs for a presbyopic population with add needs ranging from 0.75 to 2.5 D or more. As offered for sale, this lens system must also include a recommended fit guide which tells the eye care professional which lens or lenses from the lens system are fit to which eye (dominant/non-dominant) in order to provide the best vision possible. Accordingly, eye care professionals are concerned about giving the patients the best possible vision and also that the system be easy to fit and the number of trial lenses that are required to be stored in their office also be kept to a minimum. As the case with patients, it may be readily seen that current lens systems for patients with presbyopia inadequately meet the eye care professionals' needs.

SUMMARY OF THE INVENTION

The lens system for presbyopes with inter-eye disparity limits of the present invention overcomes the deficiencies associated with current lens systems as briefly described above. Specifically, the lens system of the present invention does not simply look at disparity in terms of the algebraic difference in power, but rather a disparity in what the patient is seeing, which we term visual disparity and/or disparity in vision. Understanding disparity in this way and how it relates to binocular vision provides a means to create a system of multi-focal designs for presbyopia that addresses the problems articulated above. With disparity understood in terms of the disparity in vision, the impact of not only fit may be considered, but the relationship between fit and design and overall binocular vision. The present invention is directed to a lens system, associated fit guide and a method for designing the lenses of the system.

In accordance with one aspect, the present invention is directed to a lens system for presbyopics with inter-eye vision disparity limits. The lens system comprising a fit guide specifying lens design choice and lens fit by add need, and a group of lenses including multiple designs, each of the designs having a range of refractive powers, wherein for each lens design choice and fit specified in the fit guide, the visual disparity, $\overline{\Delta}$, falls within the range defined by $\overline{\Delta}>0.2*\text{add}+0.2$ and $\overline{\Delta}<0.7*\text{add}+0.5$.

The present invention is directed to a system of lenses, a combination of lens designs and associated fit guides for presbyopia. The system of lenses may be utilized to improve binocular vision when viewing distant, intermediate and near objects by requiring a minimum level of disparity in vision between the eyes and that the level of disparity between the eyes is not objectionable to the patient. The present invention is for a system of lenses that optimally leverages the disparity of vision by defining the minimum level of inter-ocular disparity in vision required and the maximum level of inter-ocular disparity in vision required. This disparity in vision depends upon the lens design of the lenses placed in each eye and upon how the lenses are fit in each eye relative to the distance refraction of the patient.

There are two constraints on the disparity in vision $\overline{\Delta}$. The constraint on disparity in vision, $\overline{\Delta}$, that defines a minimum value for the disparity for the system of lenses in accordance with the present invention is given by $$\overline{\Delta}>0.2*\text{add}+0.2, \quad (1)$$

where add is the add need of the subject in diopters. The disparity in vision, $\overline{\Delta}$, however, has different units as is explained in detail subsequently. This constraint on minimum disparity quantifies the degree to which disparity may be utilized to improve vision with no negative consequences or tradeoffs. As an additional constraint on the system of lenses of the present invention, there is also a maximum disparity in vision to give ideal results. The maximum constraint on disparity in vision is given by $$\overline{\Delta}<0.7*\text{add}+0.5. \quad (2)$$

The combination of these two equations provides for a bounding of the disparity in vision that gives optimum overall binocular vision. The maximum disparity allowed, equation (2), sets an upper limit on the disparity above which the negative impact on vision outweighs any additional gain that may be achieved by increasing the disparity between the eyes.

This understanding of how to set the optimum level of disparity by a combination of design and fit results in improved systems of lenses for presbyopia. The system of the present invention utilizes a single vision lens and a single multi-focal design and may be utilized across the full range of the patient add needs. This one multi-focal lens system provides advantages to the patients (improved vision), to the eye care professional, and to the lens manufacturer (reduced number of lenses). By having a one lens system rather than a multi-lens system, the number of SKUs required is reduced by a factor equal to the multiple. The one lens system may be adapted for patients with astigmatism by creating a toric multi-focal lens and pairing it with a toric single vision lens. Binocular summation and inhibition, as is disclosed in greater detail subsequently, behave differently in the presence of astigmatism than when the patient has little or no astigmatism. Accordingly, improved performance for a larger segment of the population may be achieved by combining the non-toric version of the one lens system multi-focal with a toric single vision lens to provide improved performance when compared with providing the 1.0 D CYL or less low astigmatic patient with a non-toric single vision lens paired with a non-toric multi-focal. The system of the present invention requires a single multi-focal lens to be coupled with an already existing toric single vision lens.

In the interest of clarity, the term single lens system refers to a set of contact lenses wherein only a single multi-focal lens is utilized in one eye while a spherical or toric lens is utilized in the other eye. This type of system is preferable for a number of reasons, including the reduced number of SKUs for lens manufacturers and eye care professionals. It is also important to note that systems with two or more multi-focal contact lenses may be utilized that meet the design constraints of equations (1) and (2) to provide superior performance.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
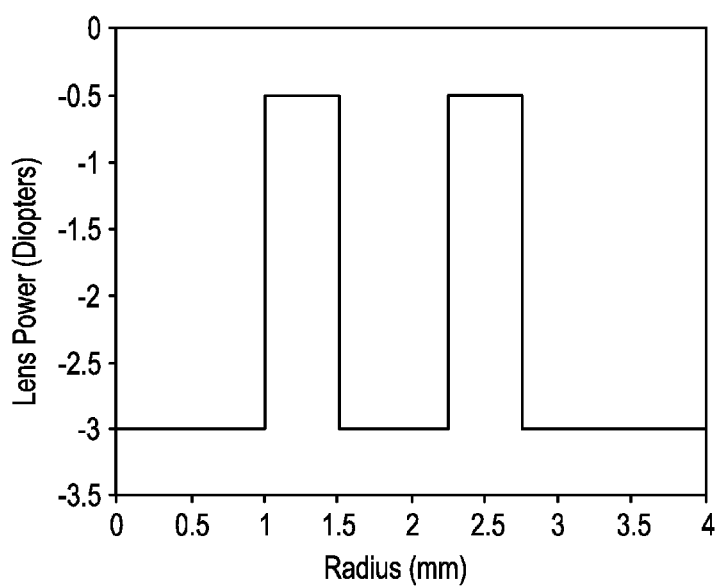
FIG. 1 is a power profile for an exemplary bifocal contact lens.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, and were relatively expensive and fragile. In addition, these early contact lenses were fabricated from materials that did not allow substantial oxygen transmission through the contact lens to the cornea which potentially could cause a number of adverse clinical effects. The rigid contact lenses of the past have undergone vast improvements in regard to oxygen transmission secondary to newer semi-flexible materials and thus a significant improvement in corneal health. These contact lenses still have limited use due to initial comfort that may be marginal at best. Later developments in the field gave rise to soft contact lenses, based upon hydrogel materials, which have become extremely popular and widely utilized today. Most recently, silicone hydrogel contact lenses that are available today combine the benefit of silicone, which has higher oxygen permeability, with the proven comfort and clinical performance of hydrogels. Essentially, these silicone hydrogel based contact lenses have higher oxygen permeability and are generally more comfortable to wear than the contact lenses made of the earlier hard materials. However, these new contact lenses are not totally without limitations.

Currently available contact lenses remain a cost effective means for vision correction. The thin plastic lenses fit over the cornea of the eye to correct vision defects, including myopia or nearsightedness, hyperopia or farsightedness, astigmatism, and presbyopia i.e. the loss of the ability of the crystalline lens to accommodate. Contact lenses are available in a variety of forms and are made of a variety of materials to provide different functionality. Daily wear soft contact lenses are typically made from soft polymer-plastic materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use tinting processes to provide different functionality. For example, a visibility tint contact lens uses a light tint to aid the wearer in locating a dropped contact lens. Eye enhancement contact lenses use either translucent or opaque tints to enhance or alter the appearance of one's eyes for a cosmetic benefit. Rigid gas permeable hard contact lenses are made from silicone polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

It is important to note that while the description of the present invention focuses on contact lenses, the principles of the invention may be applied to intra-ocular lenses, phakic and aphakic, and corneal reshaping surgeries such as Lasik. In addition, the discussion and examples are also limited to rotationally symmetric refractive designs, but this is not a limitation of the invention either. The designs could be diffractive as well as non-rotationally symmetric.

Presbyopia is corrected by algebraically adding plus optical power to a portion of the optical zone of lenses to correct the wearer's or patients near visual acuity requirements. There are many forms of bi-focal or multi-focal contact lenses for the correction of presbyopia. These design forms include concentric rings and aspheric designs, both of which may be designed for center distance or center near. All of these designs function by providing a range of powers within the pupil of the eye. For example, a concentric ring design may have a central ring that provides powers that are nominally equal to the power required to correct the distance vision of an individual, an adjacent ring that provides near power, and an outer ring that provides distance power. In accordance with the present invention, improved performance and reduced fitting time may be achieved by utilizing lens pairs that act synergistically to provide the lens wearer with good binocularity and consistent performance in near, intermediate and distance vision.

As set forth above, any number of contact lens designs may be utilized for the correction of presbyopia. In accordance with one exemplary embodiment, as disclosed in U.S. Pat. No. 8,393,733 assigned to Johnson & Johnson Vision Care Inc., sets of contact lenses satisfying certain design constraints are disclosed for treating presbyopia. Each of the sets of lenses comprises multiple lenses that provide sphere power and add power over desired ranges in a multifocal design. Preferably, each set comprises multiple lenses that provide sphere power over the range of −12.00 to +8.00 diopters in 0.5 diopter increments and add power over the range of 0.75 to 2.50 diopters in increments of 0.25 diopters. More preferably, one set of lenses provides sphere power over the range of −12.00 to +8.00 diopters in 0.50 diopter increments and add power over the range of 0.75 to 1.75 diopters in increments of 0.25 diopters, a second set of lenses provides sphere power over the range of −12.00 to +8.00 diopters in 0.5 diopter increments and add power over the range of 0.75 to 2.50 diopters in increments of 0.25 diopters, and a third set of lenses provides sphere power over the range of −12.00 to +8.00 diopters in 0.50 diopter increments and add power over the range of 1.25 to 2.50 diopters in increments of 0.25 diopters. These lenses may be organized into the pair combinations set forth in fit guides and is explained in greater detail subsequently.

A bifocal or multi-focal contact lens may be described by a power profile as illustrated in FIG. 1. The horizontal axis is the radial distance from the center of the contact lens and the vertical axis is the lens power and/or axial power at that radial position. In the example shown in FIG. 1, the power profile is rotationally symmetric about the center of the contact lens. In this bifocal exemplary embodiment a zone or ring type bifocal lens is depicted, although the lenses of the present invention may include other design types such as continuous asphere or diffractive lenses. The contact lens power profile ($P_{CL}$) may be calculated knowing the surface shapes, lens thickness, and lens index of refraction. The power profile for a contact lens may also be determined from a lens wave front measured with an interferometer. The family of lenses of the present invention is described by constraints that are applied to disparity in vision calculated from the design power profiles as described herein. Constructing a family of lenses within these constraints results in a superior balance of far, intermediate, and near vision for the wearer.

The contact lens power profile described herein is the axial power and is calculated from the wave front data utilizing the equation given by $$P_{CL}(r, \theta) = \frac{1}{r\sqrt{1 + \left(\frac{\partial W_{CL}(r, \theta)}{\partial r}\right)^2}} \frac{\partial W_{CL}(r, \theta)}{\partial r}, \qquad (3)$$

wherein $P_{CL}(r, \theta)$ is the power at radial position r, and $W_{CL}(r, \theta)$ is the wave front in polar coordinates. For wave fronts, $$\left|\frac{\partial W_{CL}(r, \theta)}{\partial r}\right| \ll 1,$$

so equation (3) may be reduced to $$P_{CL}(r, \theta) = \frac{1}{r} \frac{\partial W_{CL}(r, \theta)}{\partial r}. \qquad (4)$$

The residual power of the contact lens on eye, $P(r, \theta)$, is given by $$P(r, \theta) = P_{CL}(r, \theta) - Rx + SA_{eye} \cdot r^2 + F, \qquad (5)$$

where $P_{CL}(r, \theta)$ is the axial power of the contact lens in Diopters,
Rx is the sphere prescription in Diopters,
$SA_{eye}$ is the spherical aberration of the eye (0.08 D/mm$^2$), and
F is the lens fit relative to plano in Diopters.

In various eye models the value of $SA_{eye}$ ranges from 0.06 to 0.1. In the present invention, the value was selected in the middle of the range; namely, 0.08 D/mm$^2$. For the general population, the value of SAeye may vary +/−0.1 D/mm$^2$ and in extreme cases even greater.

Although the power profile of the contact lens and the residual power of the contact lens on eye may be described in polar coordinates and are not required to be rotationally symmetric, for simplicity, a power profile that is rotationally symmetric about the center of the lens is shown. In this case, the residual power of the contact lens is given by $$P(r) = P_{CL}(r) - Rx + SA_{eye} \cdot r^2 + F. \qquad (6)$$

Figure 2:
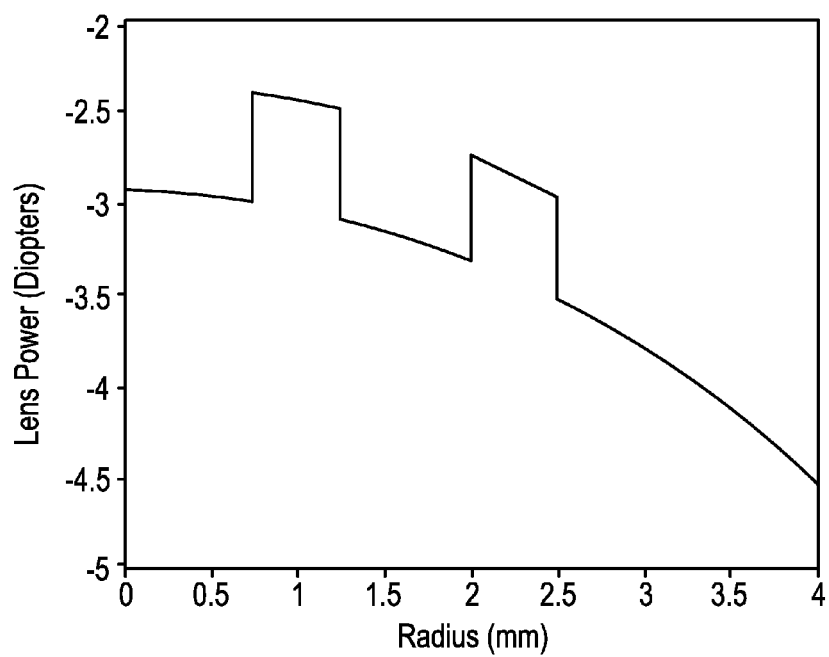
FIG. 2 is a power profile for an exemplary multifocal contact lens.
Figure 3:
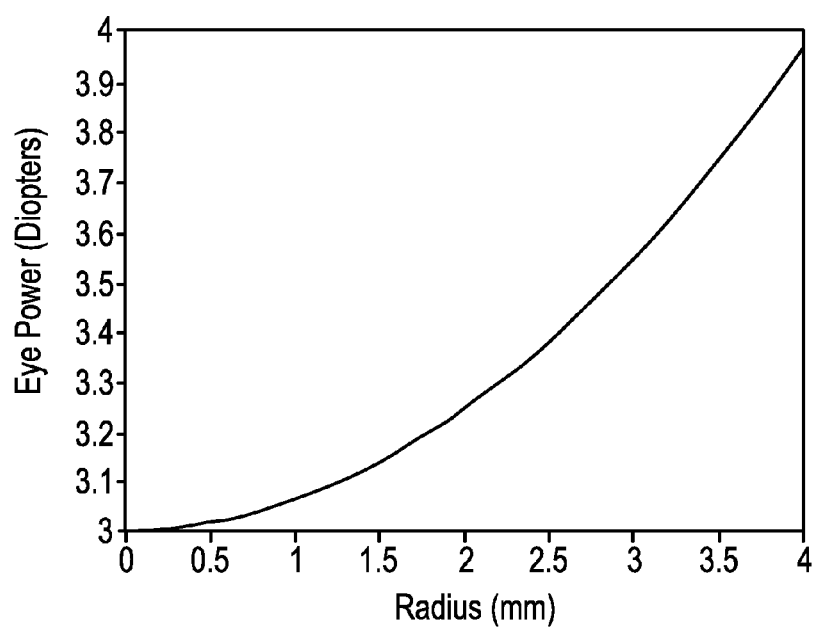
FIG. 3 is a power profile for an exemplary −3D myopic eye with 0.08 D/mm$^2$ of spherical aberration.

FIG. 2 illustrates a power profile of an exemplary multi-focal contact lens designed to be placed on a −3 D (Rx=−3.0) myopic eye. FIG. 3 shows the power profile for a −3 D myopic eye with 0.08 D/mm$^2$ of spherical aberration. The power profile illustrated in FIG. 3 is given by $$P_{eye}(r) = -Rx + SA_{eye} \cdot r^2. \qquad (7)$$

For clarity, by combining equations 6 and 7 it may be seen that $$P(r) = P_{CL}(r) + P_{eye}(r) + F. \qquad (8)$$

This gives the power, lens plus eye, for the subject viewing a distant object. For viewing a near object, as in reading, there is a power shift if the subject is unable to fully accommodate. This power shift is relative to their add requirement, given as ADD. For viewing a near (40 cm from object) the power of the lens plus eye combination becomes $$P(r) = P_{CL}(r) + P_{eye}(r) + F - ADD, \qquad (9)$$

where ADD has a value between 0.75 D and 2.5 D. The power of the contact lens plus eye may be related to the wave front of the contact lens plus eye in similar fashion to what was illustrated in equation 4 and is given by $$P(r) = \frac{1}{r} \frac{\partial W(r)}{\partial r}. \qquad (10)$$

Rearranging and integration of equation 10 gives the wave front, W, of the contact lens plus eye as $$W(R) = \int_0^R rP(r)dr, \qquad (11)$$

where R gives the radial distance from the center of the lens (and eye, and wave front). The wave front, W, given by equation 11 assumes a rotationally symmetric lens; however, to be more accurate, the wave front may be given in Cartesian coordinates. The conversion between Polar and Cartesian coordinates is well known. Given the wave front, W(x,y), the pupil function (PF) is given by $$PF(x, y) = A(x, y)e^{-i\frac{2\pi}{\lambda}W(x,y)}, \qquad (12)$$

where $A(x,y)=1$ for $r=(x^2+y^2)^{1/2}<=D/2$ and $A(x,y)=0$ for $r>D/2$ and the wavelength $\lambda$ is 0.555 microns. The pupil function, PF(x,y), is the complex amplitude within the pupil, and is zero outside of the pupil, i.e. $A(r)=0$ when $r>D/2$ where D is pupil diameter.

The amplitude point spread function (PSFa) of an optical system, in this case the lens plus eye, is given as the Fourier transform of the 2-dimensional pupil function PF(x,y) and is given by $$PSFa(u,v) = \iint PF(x,y)e^{-i\cdot 2\pi \cdot (u\cdot x + v\cdot y)}dxdy, \qquad (13)$$

with the integration done over the pupil radius. The quantities u and v have frequency units of 1/mm and are related to the angles $\theta_x$ and $\theta_y$ which are the angles in the x and y directions with units of radians in the object space and are given by $$\theta_x = \lambda \cdot u, \text{ and} \qquad (14)$$

$$\theta_y = \lambda \cdot v, \qquad (15)$$

where $\lambda$ is the wavelength in mm.
The intensity point spread function, PSF, is given by $$PSF(u,v) = PSFa(u,v) \cdot PSFa^*(u,v), \qquad (16)$$

where * refers to complex conjugate.
The optical transfer function, OTF, is given as the Fourier transform of the PSF as given by $$OTF(v_x, v_y) = \iint PSF(\theta_x, \theta_y)e^{-i2\pi \cdot (\theta_x \cdot v_x + \theta_y \cdot v_y)}d\theta_x d\theta_y, \qquad (17)$$

Where $v_x$ and $v_y$ are in cycles per radian.
The modulation transfer function, MTF, is given by $$MTF(v_x, v_y) = |OTF(v_x, v_y)|. \qquad (18)$$

The calculation of MTF from a wave front as outlined above is well known in the art and may be done numerically.
In polar coordinates the MTF becomes $$MTF(v, \Theta), \qquad (19)$$

where v is the radial frequency $$v = \sqrt{v_x^2 + v_y^2}, \qquad (20)$$

and $\Theta$ is the angle.

The average MTFa is given by $$MTFa = \frac{1}{2\pi} \int_0^{2\pi} MTF(v, \Theta) d\Theta, \quad (21)$$

The weighted area of the MTF (WA) is calculated according to the equation given by $$WA = \int_0^{20 cycles/deg} MTFa(v)^2 \cdot NCSF(v, D, L)^2 \, dv, \quad (22)$$

wherein MTFa is calculated as in equation 21 and is a function of the angular frequency, the pupil diameter, and the power profile of the lens plus eye combination, and NCSF is the neural contrast sensitivity function and depends upon the frequency, the pupil diameter (D) and the luminance (L) expressed in candelas/m². For a lens design that is not rotationally symmetric, the MTF is calculated as the average of the two-dimensional MTF.

A luminance of 250 cd/m², corresponding to the typical office environment, is exemplary of the invention and the NCSF is given by $$NCSF = \frac{1}{k \cdot \sqrt{2} \sqrt{\frac{2}{T}\left(\frac{1}{X_0^2} + \frac{1}{X_{max}^2} + \frac{v^2}{N_{max}^2}\right)} \left(\frac{1}{\eta \cdot p \cdot E} + \frac{\Phi_0}{1 - e^{-(v/v_0)^2}}\right)} \quad (23)$$

with $$E = \frac{\pi \cdot D^2}{4} \cdot L, \quad (24)$$

wherein L is the luminance (250 cd/m²),
D is the pupil diameter in mm,
and E is the luminance in Td.
The constants are as follows:

| | | |
|---|---|---|
| k = 3.0 | T = 0.1 sec | η = 0.03 |
| σ₀ = 0.5 arc min | $X_{max}$ = 12° | $\Phi_0$ = 3 × 10⁻⁸ sec deg² |
| $C_{ab}$ = 0.08 arc min/max | $N_{max}$ = 15 cycles | $u_0$ = 7 cycles/deg |

Descriptions of NCSF may be found, for example, in "Contrast Sensitivity of the Human Eye and its Effects on Image Quality" by Peter G. J. Barten published by SPIE Optical Engineering Press in 1999 which is incorporated herein by reference.

Using the weighted area, WA, the Monocular Performance (MP) can now be calculated using the equation given by $$MP = -53.0 + 25.1 * \log 10(WA) - 3.8782 * \log 10(WA)^2 + 0.1987 * \log 10(WA)^3, \quad (25)$$

with log 10(WA) denoting a log base 10 logarithm of WA.

This quantity, which may be calculated from the measured power profiles or the design power profiles of individual lenses provides the basis for the constraints that describe the lens systems of the present invention.

For each eye (left L and right R) MP is calculated for a distant object and a near object. The four quantities calculated are:
dL is MP calculated for a distant object for the lens in the left eye;
dR is MP calculated for a distant object for the lens in the right eye;
nL is MP calculated for a near object for the lens in the left eye; and
nR is MP calculated for a near object for the lens in the right eye;

The disparity in vision, $\overline{\Delta}$, is calculated using the equation given by $$\overline{\Delta} = [(\overline{dL} - \overline{dR})^2 + (\overline{nL} - \overline{nR})^2]^{0.5}, \quad (26)$$

where
$\overline{dL}$ is average of dL for pupil sizes between 2.5 and 6.0 mm diameter,
$\overline{dR}$ is average of dR for pupil sizes between 2.5 and 6.0 mm diameter,
$\overline{nR}$ is average of nR for pupil sizes between 2.5 and 6.0 mm diameter,
and
$\overline{nL}$ is average of nL for pupil sizes between 2.5 and 6.0 mm diameter.

The disparity in the distance vision is given by $$\overline{\Delta d} = (\overline{dL} - \overline{dR}), \quad (27)$$

and the disparity in the near vision is given by $$\overline{\Delta n} = (\overline{nL} - \overline{nR}). \quad (28)$$

Figure 4:
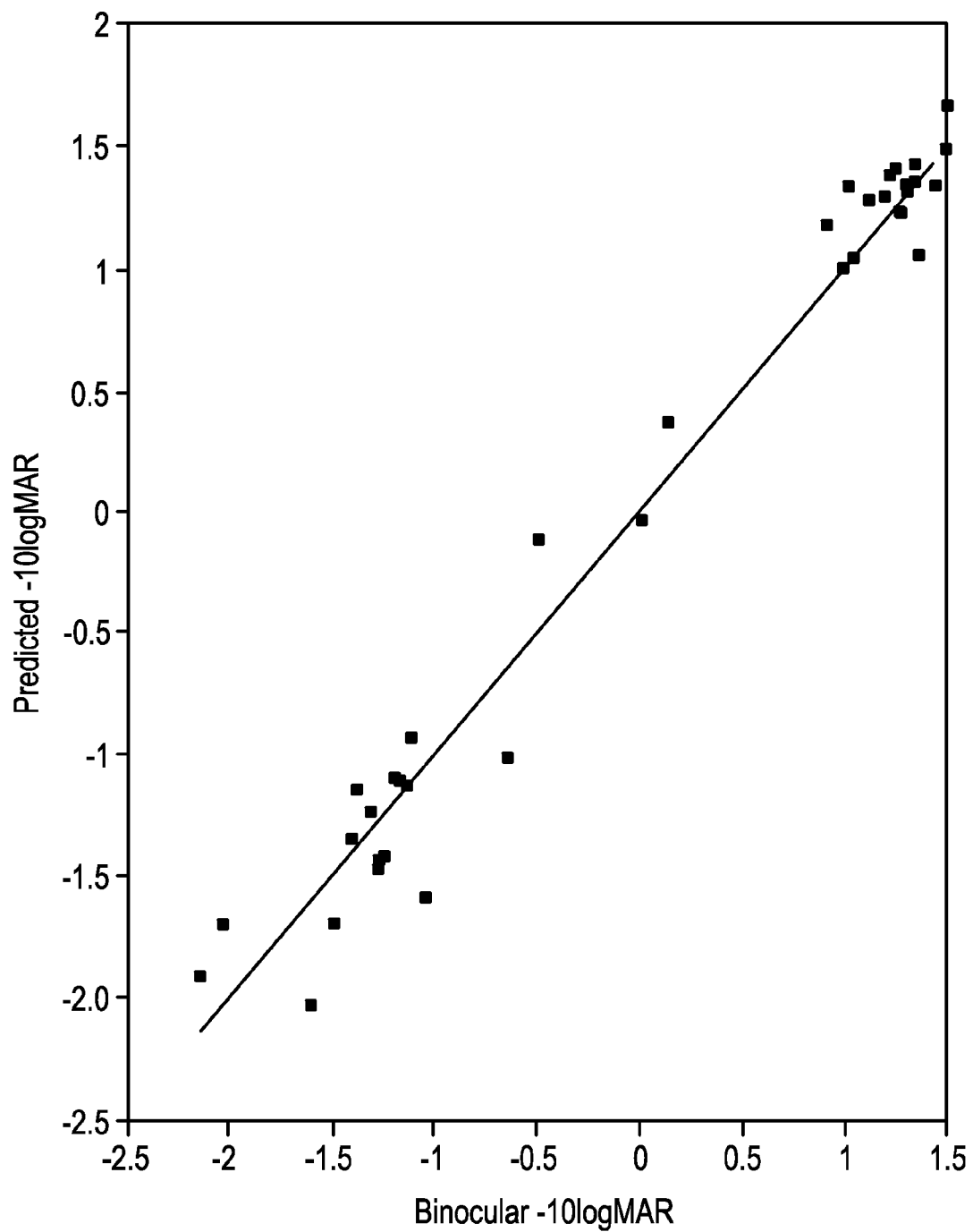
FIG. 4 is a graphical representation of a comparison between measured binocular visual acuity data in units of −10 log MAR and predicted binocular visual acuity data in units of −10 log MAR in accordance with the present invention.
Figure 5:
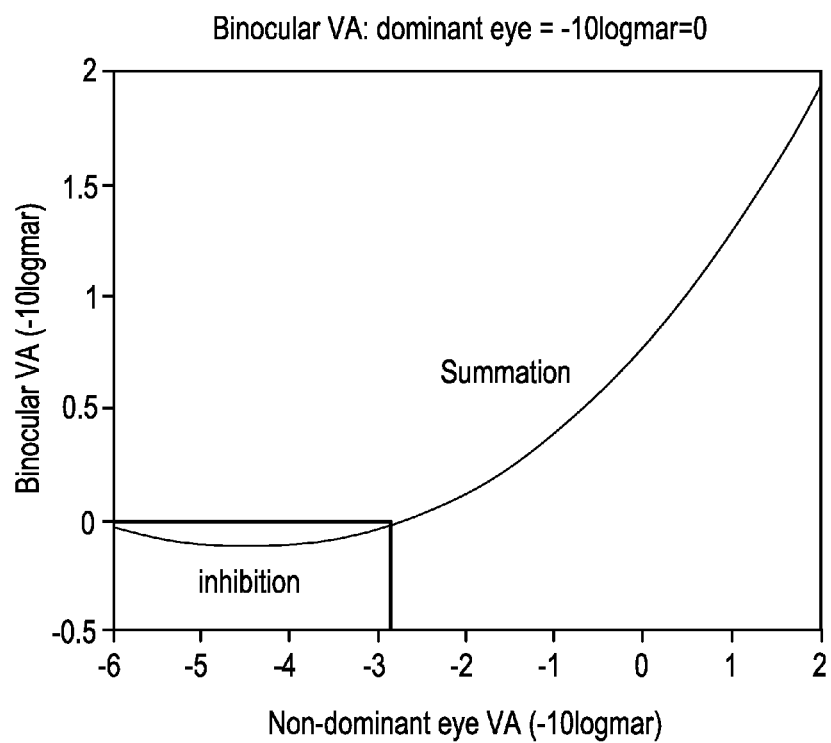
FIG. 5 is a graphical representation of a binocular vision model demonstrating regions of binocular summation and binocular inhibition.

It is easily observed that binocular vision is often better than monocular vision. Numerous studies show a phenomenon referred to as binocular summation where under certain conditions binocular vision is better than the monocular vision of either eye. There are also conditions where certain types and levels of disparity between the eyes results in binocular inhibition. In this case, the binocular vision is worse than the best monocular vision. In general, whether there is summation or inhibition depends upon the level of disparity in vision between the eyes. A clinical study was conducted where the binocular vision and the monocular vision for twenty-four subjects wearing sixteen different lens/fit combinations was measured. From the data and the suggestions from prior work, a binocular vision model was developed. The results are shown in FIGS. 4 and 5. FIG. 4 shows a comparison between the measured visual acuity data in units of −10 log MAR along the horizontal axis and that predicted by the model. The model determined from the data predicts the binocular visual acuity in MAR units from the equation given by $$MAR = 1/\text{sqrt}(0.7d^2 + 0.7n^2 + 0.065d/n), \quad (29)$$

where d and n are 1/MAR for the dominant and the non-dominant eye respectively.

Binocular summation and inhibition may be understood by referring to FIG. 5. In this figure, the Binocular VA is plotted as a function of the non-dominant eye VA in units of −10 log MAR where the monocular VA of the non-dominant eye is fixed. As long as the disparity in either distance vision $\overline{\Delta d}$ or near vision $\overline{\Delta n}$ is less than approximately 3.0 (in units of −10 log MAR) then the vision sums to give better vision binocularly then either eye monocularly. Once the disparity is greater than 3 lines then the inhibition in vision occurs and the binocular vision is worse than the best monocular vision.

A significant aspect of the present invention is that by constraining the disparity to be within the range where binocular summation is ensured, an improved lens pair may be realized. To do this requires consideration to be given to both vision while viewing distance objects and vision while viewing near objects. Considering both binocular distance vision and binocular near vision the best overall vision is achieved when the disparity is bounded within a region that has a minimum disparity in vision and a maximum disparity in vision. The maximum and minimum disparity in vision are given by $$\overline{\Delta} > 0.2 * add + 0.2 \quad (30)$$

and $$\overline{\Delta} < 0.7 * add + 0.5, \quad (31)$$

where add is the add need of the subject in diopters. $\overline{\Delta}$ has units of −10 log MAR, so the first constant in each of the equations has units of −10 log mar/D and the second constant has units of −10 log MAR.

The disparity in vision, $\overline{\Delta}$, as well as the disparity in distance vision, $\overline{\Delta d}$, and the disparity in near vision, $\overline{\Delta n}$, all depend on the power profile of the design in each of the eyes as well as how the designs are fit relative to plano.

The constraints on disparity in vision, $\overline{\Delta}$, in equations 30 and 31 is used to define the full presbyopic lens system to meet add needs for patients from 0.75 to 2.5 D. This presbyopic lens system is made up of at least one design coupled with a recommended fit guide or table.

As an additional constraint, the average binocular distance vision $\overline{bD}$ is constrained by the equations given by $$\overline{bD} > -0.2 * add + 0.6, \quad (32)$$

and the binocular near vision $\overline{bN}$ is constrained by the equation given by $$\overline{bN} > -1.3 * add + 1.2. \quad (33)$$

The binocular distance vision and binocular near vision are calculated using the binocular summation model given in equation 29. Note that the result from equation 29 is in units of MAR, whereas the constraint given on bD and bN is in units of −10 log MAR. The inputs to equation 29, d and n, also need to be in units of MAR. The input values used, $\overline{dL}$, $\overline{dR}$, $\overline{nR}$, and $\overline{nL}$ are in units of −10 log MAR and must be converted to MAR units.

Lenses of the present invention, as described by the above constraints, are designed using a novel design method as herein described. First, an initial fit guide that gives the lens choices and lens fits relative to the distance refraction for each add need that the system will address is created. This fit guide is determined to provide an intuitive guide for the practitioner, and to provide for a reasonable initial guess as to how the lenses are chosen and fit to meet the increasing add needs of the patients. Next, a merit function is created that provides a measure of the overall performance of the system. This total merit function is made up of a weighted sum of a binocular merit function that is calculated for each add need that will be addressed by the system. For each add need the binocular merit function includes a binocular vision model, for example as described above and summarized in equation 29. This binocular merit function will depend upon the design in each eye, the fit of that design relative to the distance refraction, the optical properties of the eye, and the add need of the subject. Finally, there is optimization procedure that adjusts the lens designs and if required the fit table to minimize the total merit function. The procedure may be manual requiring constant designer intervention, but ideally uses a computerized numerical optimization procedure such as simulated annealing or damped least squares or any number of other suitable algorithms.

Example 1

Figure 6:
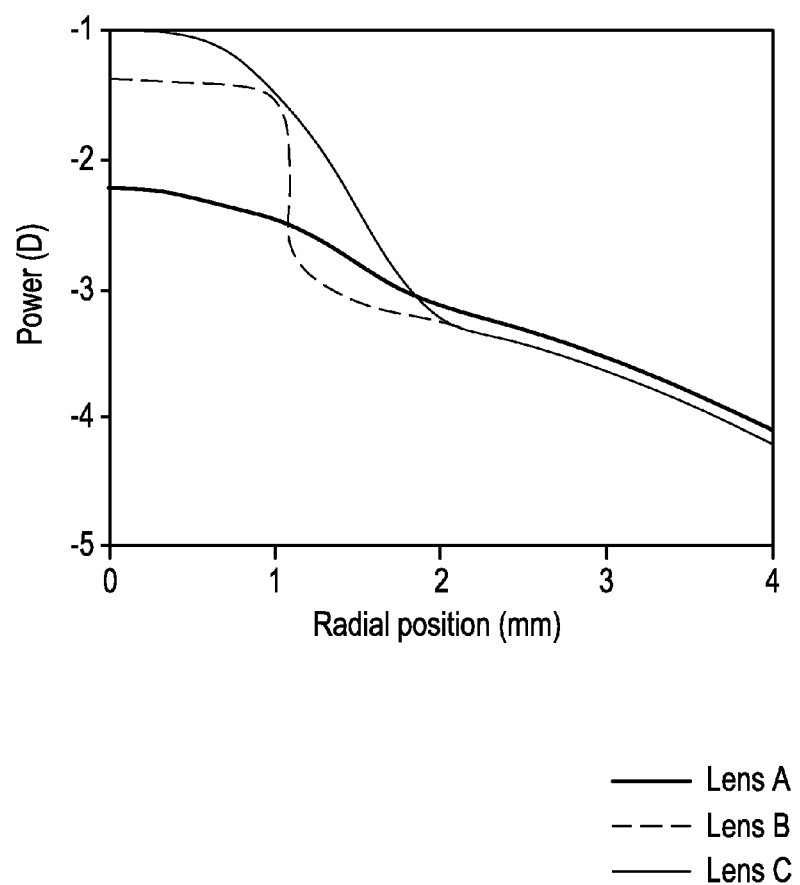
FIG. 6 is a graphical representation of the power profiles of a first set of three lenses in accordance with a first example.

The first design example is for a system of lenses made up of three designs. The three lenses are designated as lens A, lens B, and lens C. The design for each is a rotationally symmetric continuous asphere type design whose power profiles are illustrated in FIG. 6. These power profiles are for −3.0 D lenses.

The following table, Table 1, gives the fit recommendation for these lenses. The fit designated in Table 1 is the lens (A, B or C) and the lens power relative to the distance refraction.

TABLE 1

| | ADD | | | | | | | |
|---|---|---|---|---|---|---|---|---|
| Eye | 0.75 | 1.0 | 1.25 | 1.5 | 1.75 | 2.0 | 2.25 | 2.5 |
| Dominant | A 0.00 | A 0.00 | A 0.00 | B 0.00 | B 0.00 | B 0.00 | B 0.00 | B 0.00 |
| Non-dominant | A + 0.25 | A + 0.25 | A + 0.25 | C 0.00 | C 0.00 | C 0.00 | C 0.00 | C 0.00 |

Figure 7:
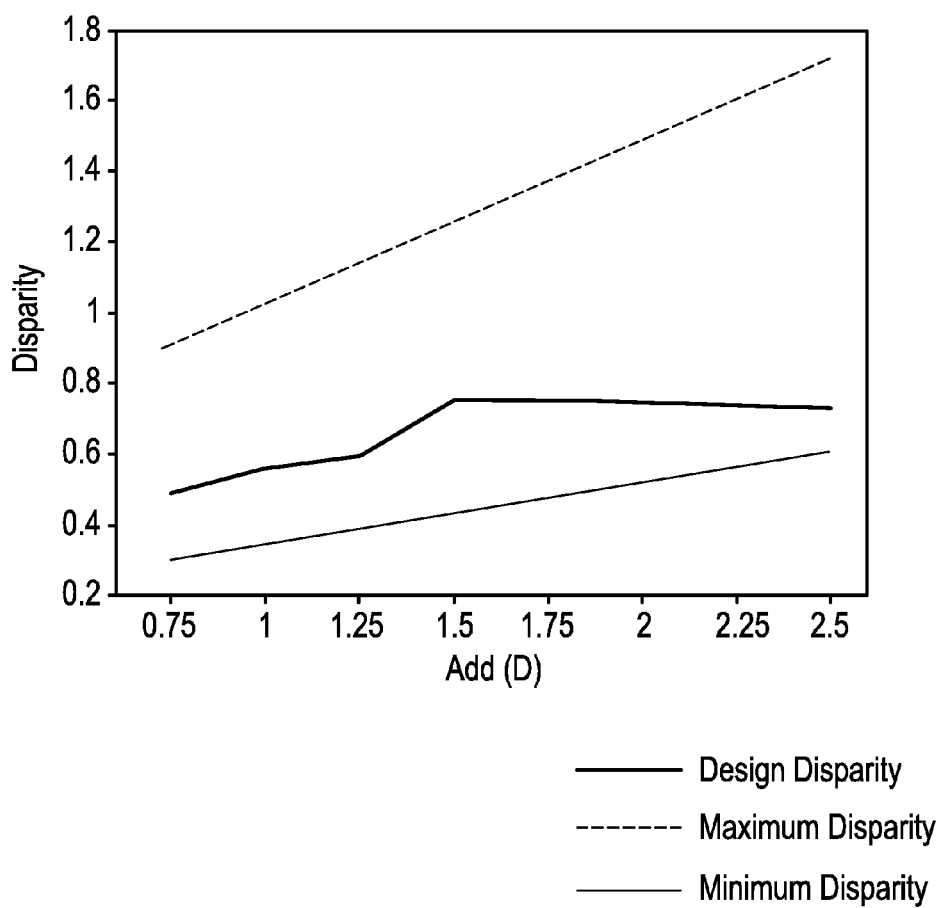
FIG. 7 is a graphical representation of the disparity calculation for all of the add needs in a first lens system of the first example satisfying the design constraints of the present invention.

FIG. 7 illustrates the result of the disparity calculation from equation 26 for all of the add needs in Table 1 plotted along with the maximum and minimum constraints demonstrating that this system of lenses satisfies the constraints given by equations 30 and 31.

Figure 8:
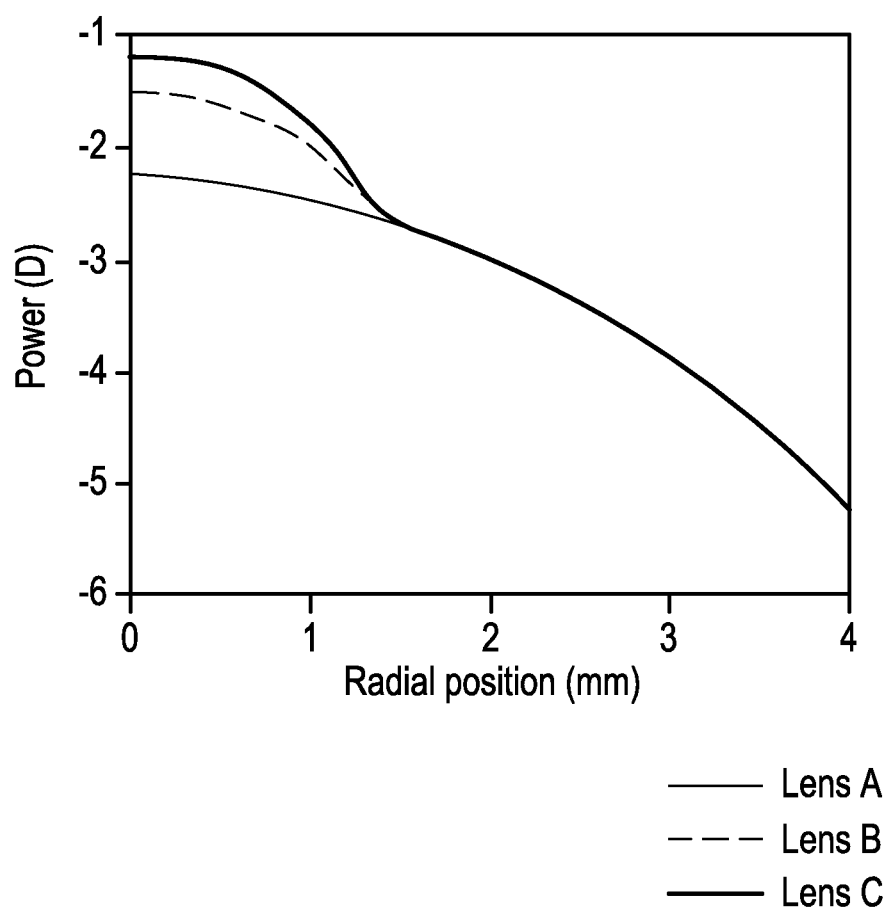
FIG. 8 is a graphical representation of the power profile of a second set of these lenses in accordance with the first example.

FIG. 8 illustrates the power profiles for a system of lenses of the prior art. The following table, Table 2, shows the fit guide for this system of lenses.

TABLE 2

| | ADD | | | | | | | |
|---|---|---|---|---|---|---|---|---|
| Eye | 0.75 | 1.0 | 1.25 | 1.5 | 1.75 | 2.0 | 2.25 | 2.5 |
| Dominant | A 0.00 | A 0.00 | B 0.00 | B 0.00 | B 0.00 | B 0.00 | C 0.00 | C 0.00 |
| Non-dominant | A 0.00 | A 0.00 | B 0.00 | B 0.00 | C 0.00 | C 0.00 | C 0.00 | C 0.00 |

Figure 9:
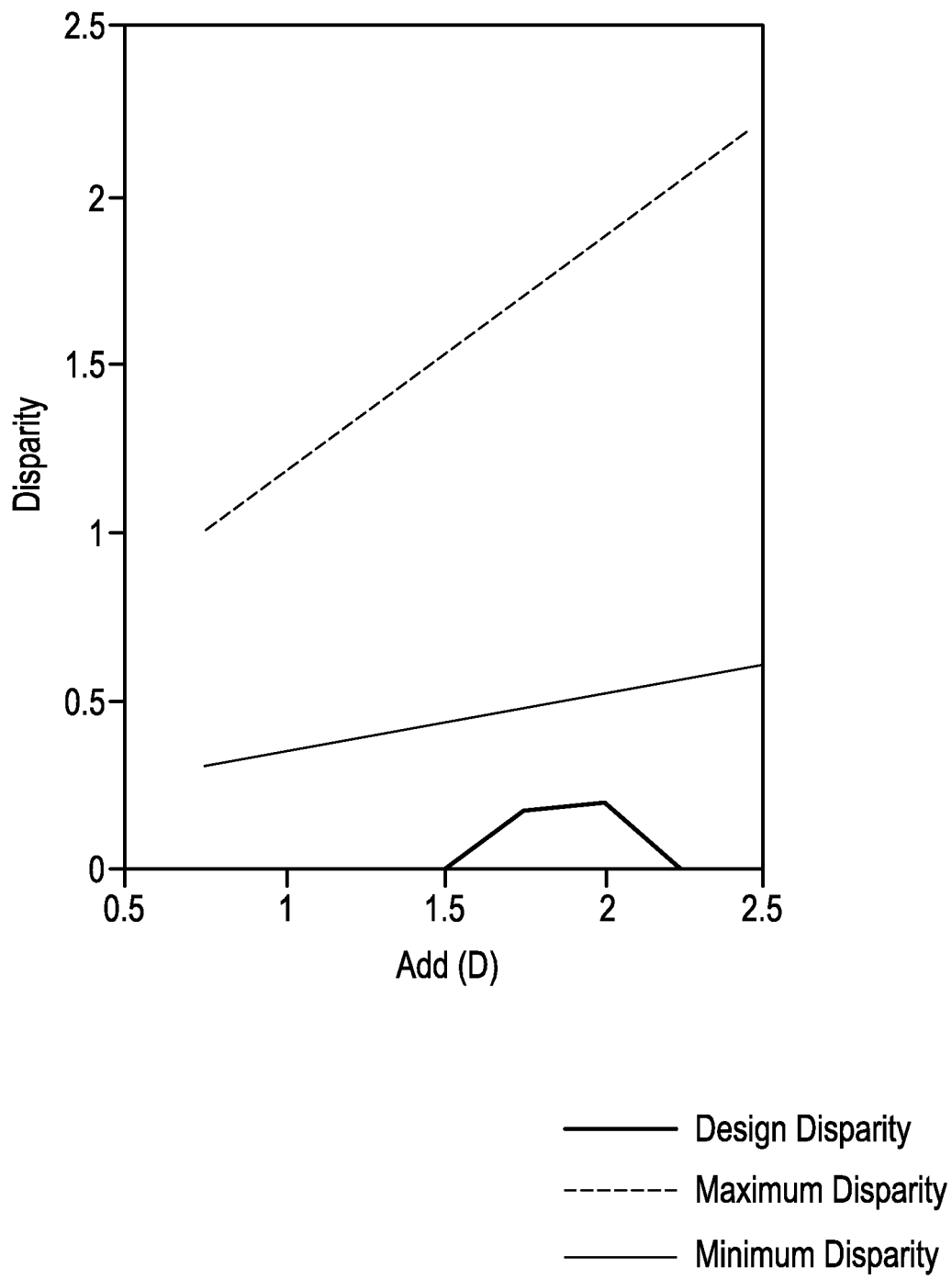
FIG. 9 is a graphical representation of the disparity calculation for all of the add needs in a second lens system of the first example not satisfying the design constraints of the present invention.

FIG. 9 illustrates the result of the disparity calculation for this system of lenses of the prior art showing that the disparity in vision falls outside of the limits defined in equations 30 and 31.

Figure 10:
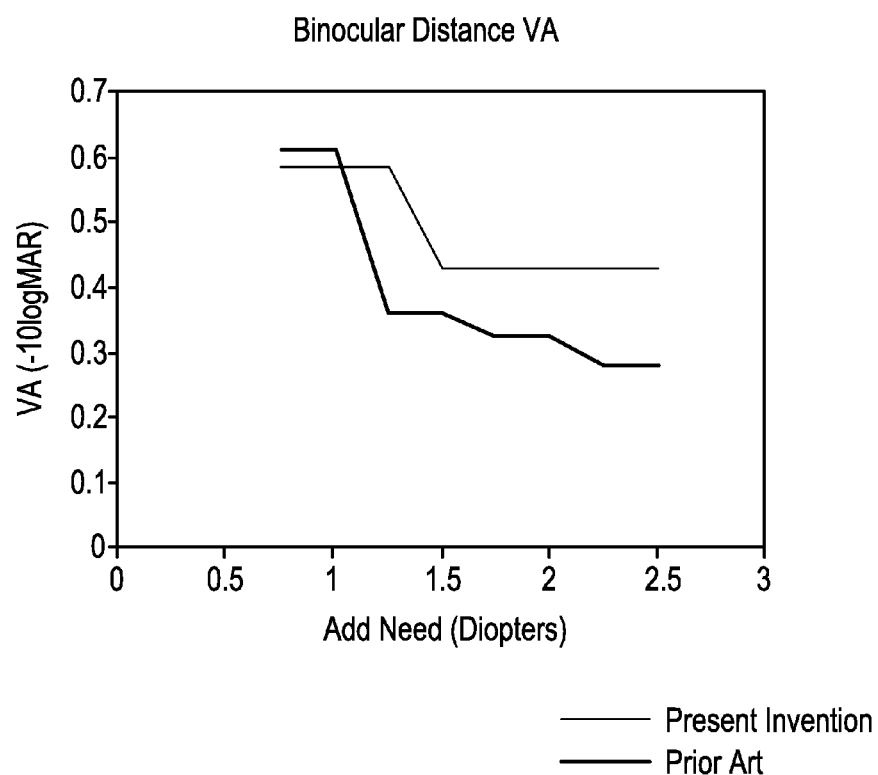
FIG. 10 is a graphical representation of the distance binocular visual acuity for the first and second lens systems of the first example.
Figure 11:
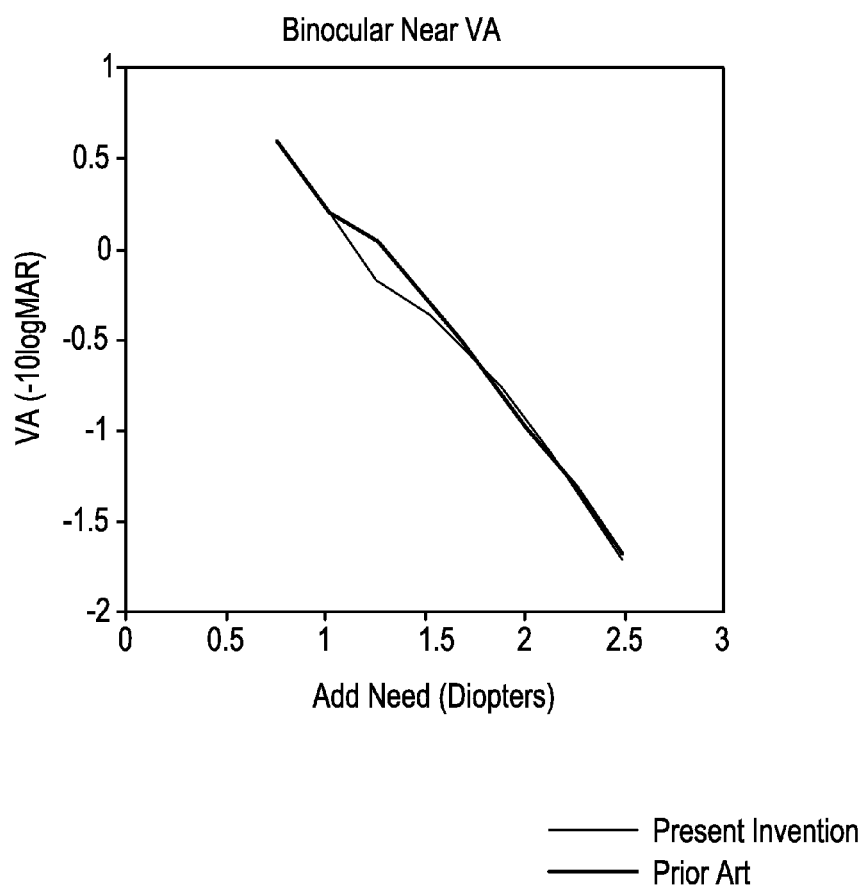
FIG. 11 is a graphical representation of the near binocular visual acuity for the first and second lens systems of the first example.

FIGS. 10 and 11 illustrate the calculations of distance and near Binocular VA, respectively, using the binocular vision model summarized in equation 29, thereby showing the advantage of the example lens system over a prior art system.

The following table, Table 3, shows the initial fit guide for the example system (same as above) along with the recommended changes to make if the after the initial fit the subject requires either improved near vision or improved distance vision.

TABLE 3

| | | | Initial Fit Guide | | | | | |
|---|---|---|---|---|---|---|---|---|
| Patient Add | 0.75 | 1 | 1.25 | 1.5 | 1.75 | 2 | 2.25 | 2.5 |
| Dominant Eye | A | A | A | B | B | B | B | B |
| Non-dominant Eye | A + 0.25 | A + 0.25 | A + 0.25 | C | C | C | C | C |

| | | | Subject Needs More Near | | | | | |
|---|---|---|---|---|---|---|---|---|
| | 0.75 | 1 | 1.25 | 1.5 | 1.75 | 2 | 2.25 | 2.5 |
| Dominant Eye | A | A | A | B | B | B | B | B |
| Non-dominant Eye | B | B | B | C + 0.25 | C + 0.25 | C + 0.25 | C + 0.25 | C + 0.25 |

| | | | More Distance | | | | | |
|---|---|---|---|---|---|---|---|---|
| | 0.75 | 1 | 1.25 | 1.5 | 1.75 | 2 | 2.25 | 2.5 |
| Dominant Eye | A | A | A | A | A | A | A | A |
| Non-dominant Eye | A | A | A | C | C | C | C | C |

Example 2

Figure 12:
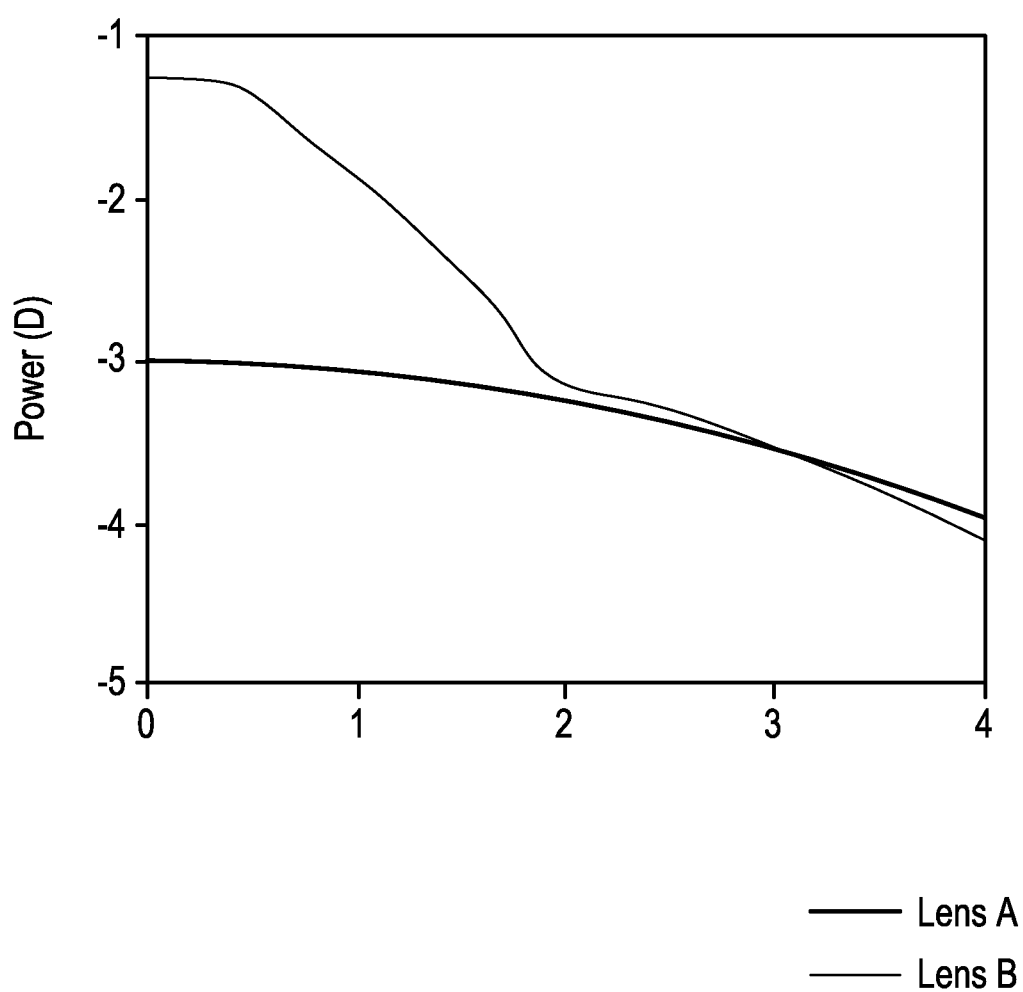
FIG. 12 is a graphical representation of the power profile of two lenses, one lens system, in accordance with a second example.

The second design example is for a system comprising a single vision lens that is worn in the dominant eye and a continuous asphere type multi-focal lens worn in the non-dominant eye. By using a single vision lens in the dominant eye, this system only requires one multi-focal lens to be manufactured and stocked. The power profiles for these two lenses ("lens A" is the single vision lens which in this example is a spherical lens, and lens B is the continuous asphere multi-focal lens) are illustrated in FIG. 12.

Figure 13:
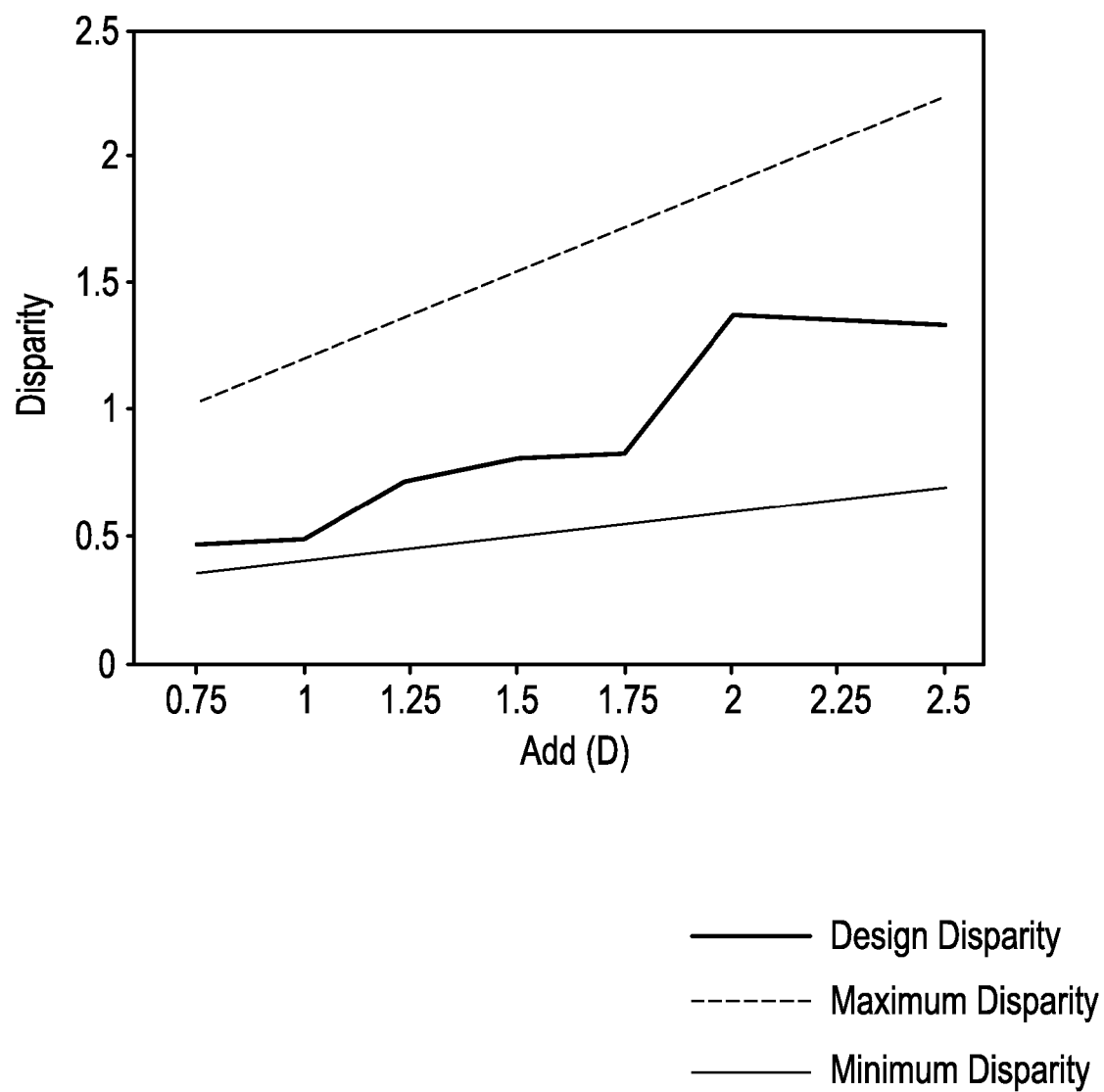
FIG. 13 is a graphical representation of the disparity calculation for all of the add needs in the one lens system of the second example satisfying the design constraints of the present invention.

The fit guide in the following table, Table 4, results in the disparity shown in FIG. 13. As shown, the design disparity is between the minimum and maximum disparities as calculated utilizing equations 30 and 31.

TABLE 4

| | ADD | | | | | | | |
|---|---|---|---|---|---|---|---|---|
| Eye | 0.75 | 1.0 | 1.25 | 1.5 | 1.75 | 2.0 | 2.25 | 2.5 |
| Dominant | A 0.25 | A 0.25 | A 0.25 | A 0.25 | A 0.25 | A 0.25 | A 0.25 | A 0.25 |
| Non-dominant | B − 0.25 | B − 0.25 | B 0.0 | B 0.00 | B 0.00 | B 0.25 | B 0.25 | B 0.25 |

Figure 14:
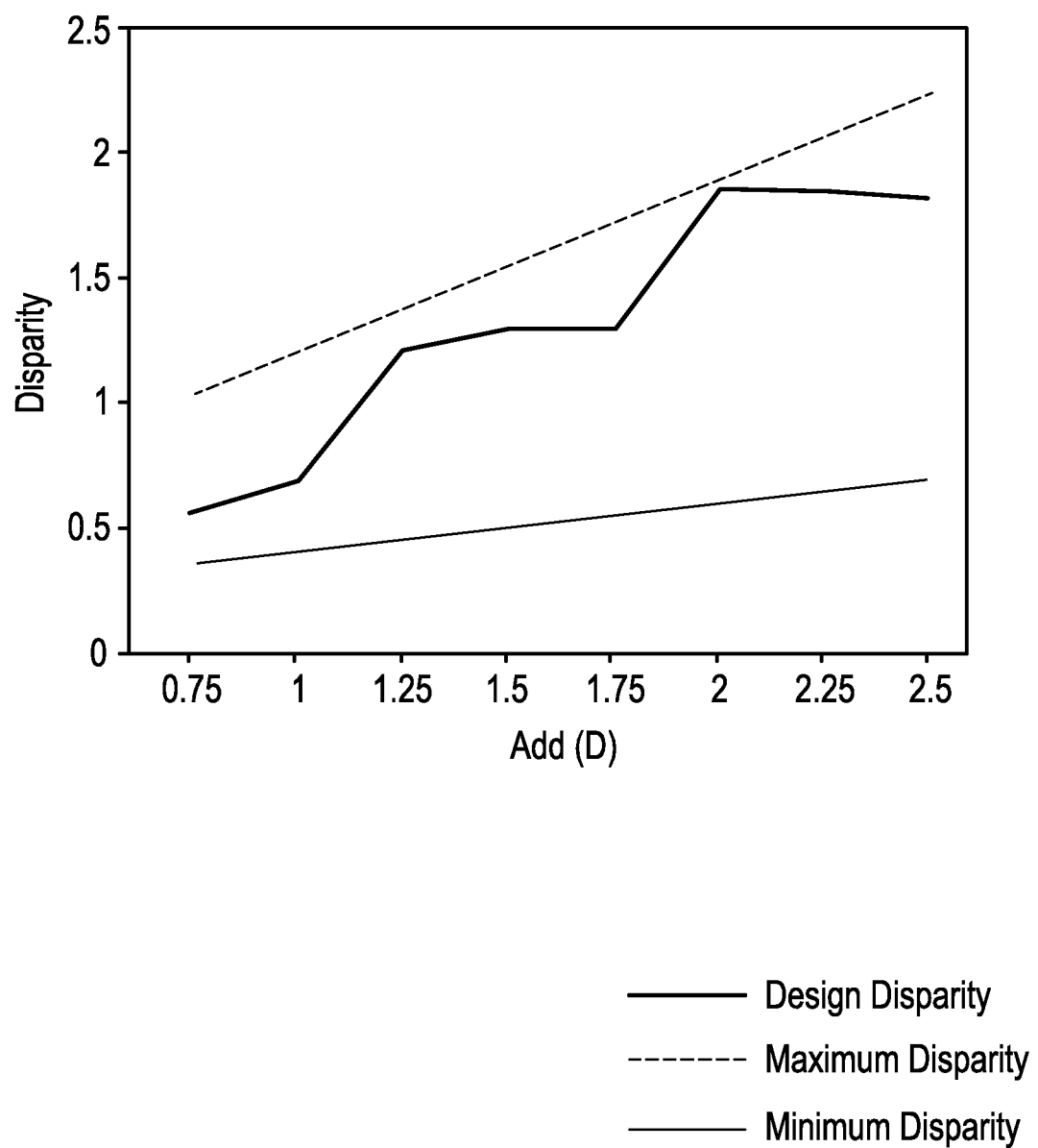
FIG. 14 is a graphical representation of a second disparity calculation for all add needs in the one lens system of the second example satisfying the design constraints of the present invention.

Other fit guides are possible, as long as the disparity constraints are met. The following fit guide, Table 5, results in the disparity results shown in FIG. 14. Once again, the design disparity is between the minimum and maximum disparities as calculated utilizing equations 30 and 31.

TABLE 5

| | ADD | | | | | | | |
|---|---|---|---|---|---|---|---|---|
| Eye | 0.75 | 1.0 | 1.25 | 1.5 | 1.75 | 2.0 | 2.25 | 2.5 |
| Dominant | A 0.00 | A 0.00 | A 0.00 | A 0.00 | A 0.00 | A 0.00 | A 0.00 | A 0.00 |
| Non-dominant | B − 0.25 | B − 0.25 | B 0.0 | B 0.00 | B 0.00 | B 0.25 | B 0.25 | B 0.25 |

The "one lens system" described above comprises of a spherical single vision lens paired with a rotationally symmetric continuous asphere multifocal lens. The single vision lens could also be aspheric, and the multifocal lenses could be of other design types such as diffractive, or have alternating distance and near zones, or be an asymmetric design type as long as the pair of lenses and fit guide meets the constraints in equations 30 and 31.

Figure 15:
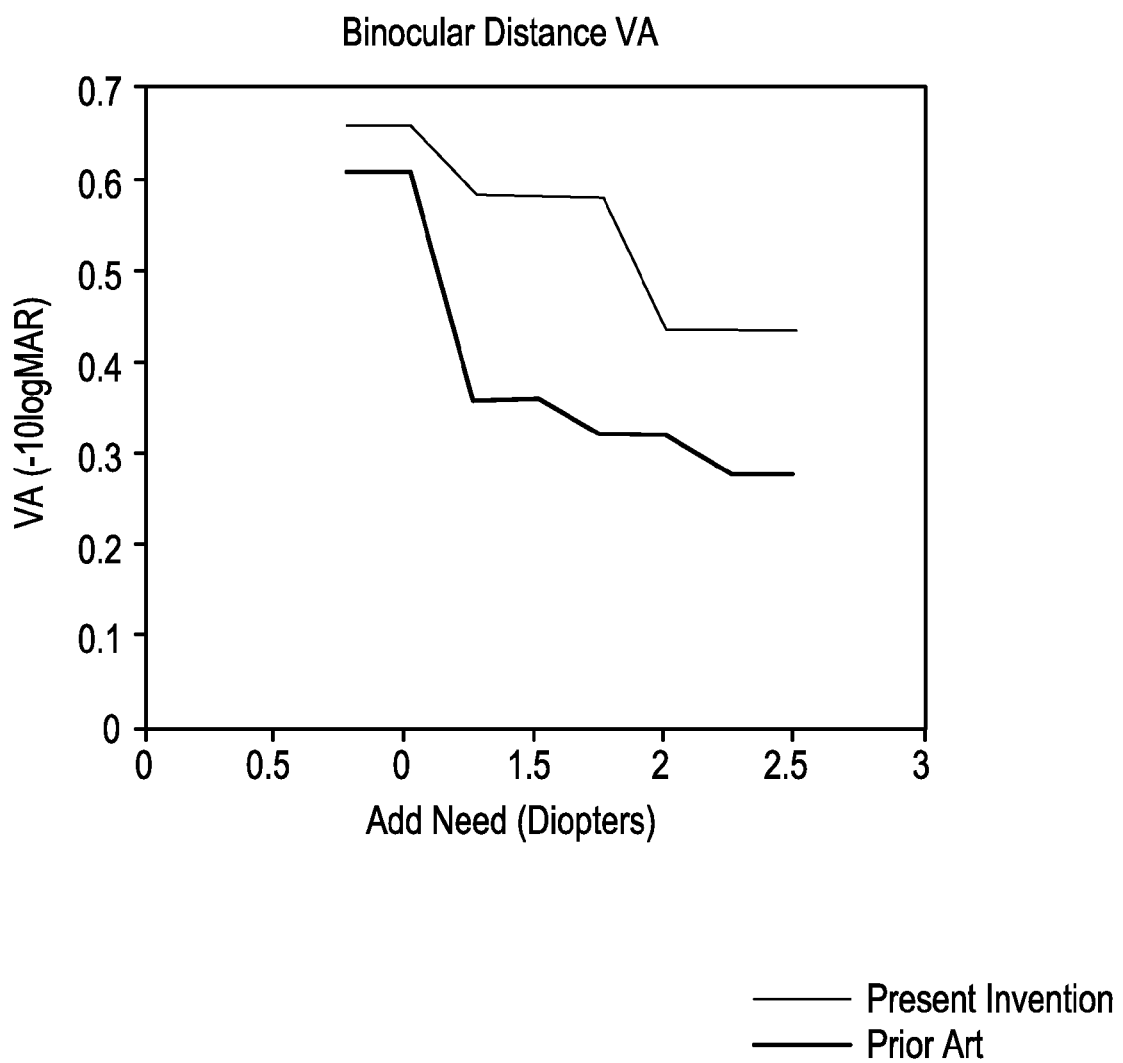
FIG. 15 is a graphical representation of the distance binocular visual acuity for the one lens system of the second example as compared to the prior art.
Figure 16:
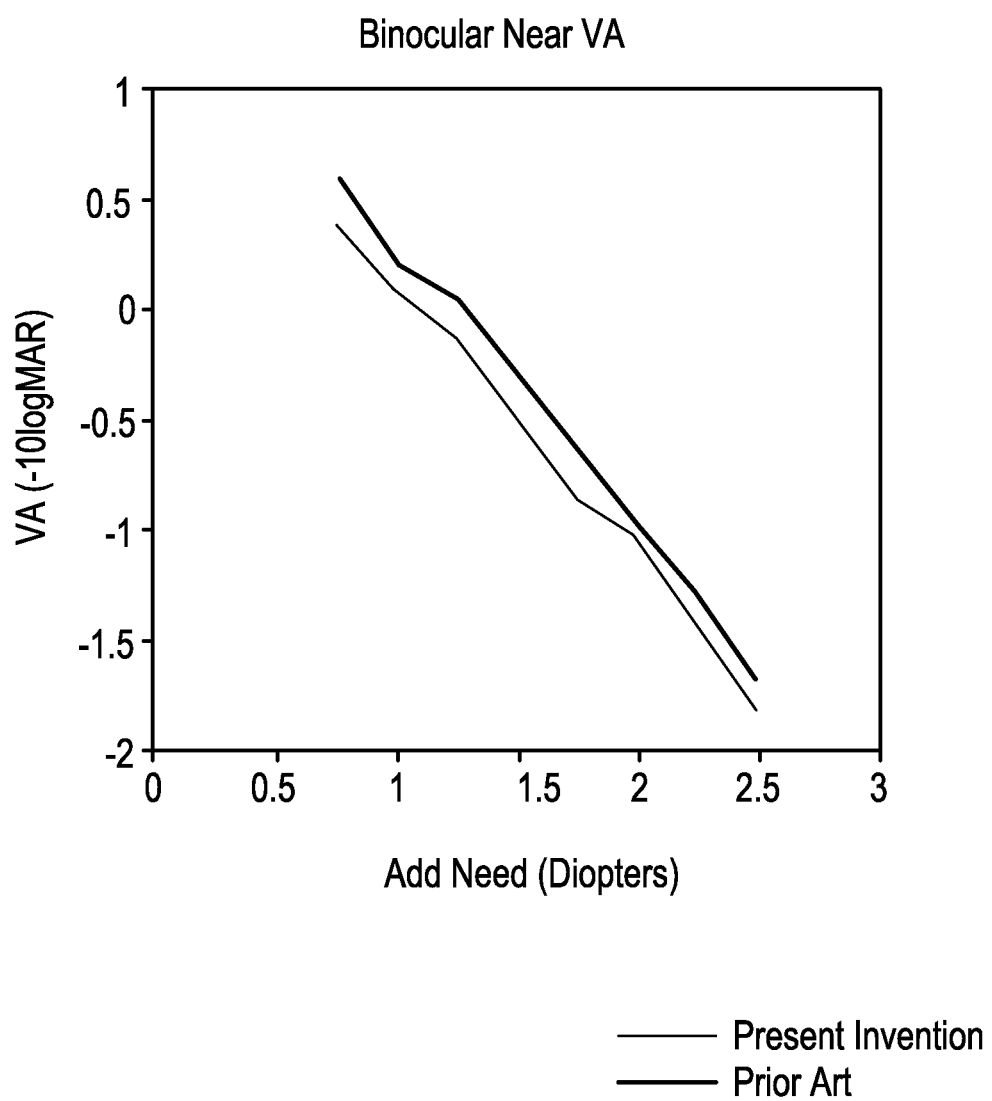
FIG. 16 is a graphical representation of the near binocular visual acuity for the one lens system of the second example as compared to the prior art.

FIGS. 15 and 16 show calculations of distance and near Binocular VA using the binocular vision model summarized in equation 29 showing the advantage of the example lens system over a prior art system.

The following table, Table 6, shows the nominal fit guide for the one lens system along with recommended changes to make if the after the initial fit the subject requires either improved near vision or improved distance vision.

TABLE 6

| | | Initial Fit Guide | | | | | | | |
|---|---|---|---|---|---|---|---|---|---|
| | | 0.75 | 1 | 1.25 | 1.5 | 1.75 | 2 | 2.25 | 2.5 |
| Dominant | SV | 0.25 | 0.25 | 0.25 | 0.25 | 0.25 | 0.25 | 0.25 | 0.25 |
| Non_Dominant | Multi-Focal | −0.25 | −0.25 | 0 | 0 | 0 | 0.25 | 0.25 | 0.25 |

TABLE 6-continued

Subject Needs More Near (option #1) – Add + 0.25D DOMINIANT eye

| | | 0.75 | 1 | 1.25 | 1.5 | 1.75 | 2 | 2.25 | 2.5 |
|---|---|---|---|---|---|---|---|---|---|
| Dominant | SV | 0.5 | 0.5 | 0.5 | 0.5 | 0.5 | 0.5 | 0.5 | 0.5 |
| Non_Dominant | Multi-Focal | −0.25 | −0.25 | 0 | 0 | 0 | 0.25 | 0.25 | 0.25 |

More Near (option #2) Add + 0.25D to Non-dominant Eye

| | | 0.75 | 1 | 1.25 | 1.5 | 1.75 | 2 | 2.25 | 2.5 |
|---|---|---|---|---|---|---|---|---|---|
| Dominant | SV | 0.25 | 0.25 | 0.25 | 0.25 | 0.25 | 0.25 | 0.25 | 0.25 |
| Non_Dominant | Multi-Focal | 0 | 0 | 0.25 | 0.25 | 0.25 | 0.5 | 0.5 | 0.5 |

More Distance (option #1) – Add − 0.25D to NON-DOMINANT eye

| | | 0.75 | 1 | 1.25 | 1.5 | 1.75 | 2 | 2.25 | 2.5 |
|---|---|---|---|---|---|---|---|---|---|
| Dominant | SV | 0.25 | 0.25 | 0.25 | 0.25 | 0.25 | 0.25 | 0.25 | 0.25 |
| Non_Dominant | Multi-Focal | −0.5 | −0.5 | −0.25 | −0.25 | −0.25 | 0 | 0 | 0 |

More Distance (option #2) – Add − 0.25D to Dominant eye

| | | 0.75 | 1 | 1.25 | 1.5 | 1.75 | 2 | 2.25 | 2.5 |
|---|---|---|---|---|---|---|---|---|---|
| Dominant | SV | 0 | 0 | 0 | 0 | 0 | 0 | 0 | 0 |
| Non_Dominant | Multi-Focal | −0.25 | −0.25 | 0 | 0 | 0 | 0.25 | 0.25 | 0.25 |

Example 3

If the patient is astigmatic, the design results described in EXAMPLE 2 may be achieved by substituting the single vision lens in the non-dominant eye with a single vision toric design in the dominant eye and a toric multi-focal in the non-dominant eye. For the toric multi-focal, the toric surface is most commonly placed on the back surface of the lens. The power profile for a −3 D toric multi-focal lens will be the same as shown in FIG. 12 along the astigmatic axis and will be shifted by an amount equal to the cylinder prescription in the along the orthogonal axis.

The presbyopic lens system described here fully corrects the astigmatism in both of the subject's eyes, but also meets the constraints given in equations 30 and 31 and thus provides a good balance for binocular distance, intermediate, and near vision. This system provides advantage over other presbyopic systems for astigmatic subjects because the number of new SKU's required to be manufactured and stocked in ECP's trial sets is reduced over traditional two and three lens presbyopic systems.

Example 4

The above discussion about binocular vision and in particular binocular summation and binocular inhibition has considered cases where the disparity in vision between the eyes is dominated by rotationally symmetric defocus and aberrations. Inhibition occurs with smaller levels of disparity when there are non-rotationally symmetric aberrations present in either the contact lens or in the eye. In particular, when astigmatism is present binocular inhibition occurs to a much greater degree (Colins M, Goode A, Brown B, Distance Visual Acuity and Monovision. Optometry and Vision Science 1993; 70:723-728). The impact on binocular vision of disparity in vision is negatively impacted by the presence of cylinder (astigmatism) in the dominant eye. This design example provides in the dominant eye a toric lens that fully corrects the astigmatism, and a multi-focal lens in the non-dominant eye. The multi-focal lens is the same as in EXAMPLE 2 and the fit guide is the same with the addition being that the toric lens in the dominant eye is used to as close as practical to correct the astigmatism in the subject's dominant eye.

Normally, the lowest cylinder correction provided for contact lens patients is 0.75 D. Because reduction in binocular vision in the presence of disparity presbyopes need smaller amounts of astigmatism in the dominant eye corrected. For this presbyopic system, the toric correction in the dominant eye needs to be as low as 0.25 D.

It is important to note that while the invention has been described in detail with respect to contact lenses, the principles and inventive concepts described herein apply equally to other types of lenses, including intraocular lenses or IOLs. In addition, as used herein contact lenses include single vision contact lenses, bi-focal contact lenses, multi-focal contact lenses, toric contact lenses, diffractive contact lenses, concentric ring contact lenses, continuous asphere contact lenses, hard contact lenses, soft contact lenses and any type of contact lens.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A lens system for presbyopes with inter-eye vision disparity limits, the lens system comprising:
   a fit guide including lens choices and lens fits relative to the distance refraction for each add need for the lens system; and
   a group of lenses including multiple designs, each of the designs having a range of refractive powers, wherein for each lens design choice and fit specified in the fit guide, the visual disparity, $\overline{\Delta}$, has a lower limit defined by $\overline{\Delta} > 0.2*\text{add} + 0.2$ and an upper limit defined by $\overline{\Delta} < 0.7*\text{add} + 0.5$, for an add of less than or equal to 0.75.

2. The lens system according to claim 1, further comprising constraints on the average binocular distance vision $\overline{bD}$ and the average binocular near vision $\overline{bN}$, wherein $\overline{hD} > -0.2*\text{add} + 0.6$, and $\overline{bN} > -1.3*\text{add} + 1.2$.

3. The lens system according to claim 1, wherein the group of lenses comprises contact lenses.

4. The lens system according to claim 3, wherein the contact lenses include single vision contact lenses.

5. The lens system according to claim 3, wherein the contact lenses include bi-focal contact lenses.

6. The lens system according to claim 3, wherein the contact lenses include multi-focal contact lenses.

7. The lens system according to claim 3, wherein the contact lenses include toric contact lenses.

8. The lens system according to claim 3, wherein the contact lenses include diffractive contact lenses.

9. The lens system according to claim 3, wherein the contact lenses include continuous asphere contact lenses.

10. The lens system according to claim 3, wherein the system consists of a toric single vision lens design and a non-toric multifocal lens design.

11. The lens system according to claim 3, wherein the system consists of a toric single vision lens design and a toric multifocal lens design.

12. The lens system according to claim 1, wherein the group of lenses comprises intraocular lenses.

* * * * *